(12) United States Patent
Chi et al.

(10) Patent No.: US 8,476,782 B2
(45) Date of Patent: Jul. 2, 2013

(54) WEC WITH IMPROVED POWER TAKE OFF APPARATUS

(75) Inventors: Wei-Ming Chi, Feasterville, PA (US); Philip R. Hart, Yardley, PA (US)

(73) Assignee: Ocean Power Technologies, Inc., Pennington, NJ (US)

( * ) Notice: Subject to any disclaimer, the term of this patent is extended or adjusted under 35 U.S.C. 154(b) by 444 days.

(21) Appl. No.: 12/798,055

(22) Filed: Mar. 29, 2010

(65) Prior Publication Data

US 2010/0264659 A1     Oct. 21, 2010

Related U.S. Application Data

(60) Provisional application No. 61/211,439, filed on Mar. 30, 2009, provisional application No. 61/211,440, filed on Mar. 30, 2009.

(51) Int. Cl.
 *F03B 13/12* (2006.01)

(52) U.S. Cl.
 USPC .......................................................... 290/53

(58) Field of Classification Search
 USPC ..................................... 290/42, 53
 See application file for complete search history.

(56) References Cited

U.S. PATENT DOCUMENTS

| | | | | |
|---|---|---|---|---|
| 4,249,639 A * | 2/1981 | Vukovic | .......................... | 185/30 |
| 4,256,970 A * | 3/1981 | Tomassini | ...................... | 290/53 |
| 4,392,060 A * | 7/1983 | Ivy | ................................. | 290/53 |
| 4,599,858 A * | 7/1986 | La Stella et al. | ................ | 60/497 |
| 5,324,988 A * | 6/1994 | Newman | .......................... | 290/54 |
| 5,491,366 A * | 2/1996 | Newman | .......................... | 290/53 |
| 5,929,531 A * | 7/1999 | Lagno | ............................... | 290/53 |
| 7,141,888 B2 * | 11/2006 | Sabol et al. | ..................... | 290/53 |
| 7,305,823 B2 * | 12/2007 | Stewart et al. | .................. | 60/495 |
| 7,536,859 B2 * | 5/2009 | Tai et al. | ......................... | 60/497 |
| 7,598,624 B2 * | 10/2009 | Loui et al. | ...................... | 290/42 |
| 7,768,143 B2 * | 8/2010 | McCague et al. | ............... | 290/42 |
| 7,872,365 B2 * | 1/2011 | Rourke | ............................. | 290/53 |
| 7,969,031 B2 * | 6/2011 | Steelberg et al. | ............... | 290/42 |
| 8,004,103 B2 * | 8/2011 | Brantingham | .................. | 290/53 |
| 8,110,935 B2 * | 2/2012 | Shin | ................................. | 290/42 |
| 2008/0016863 A1 * | 1/2008 | Tai et al. | ......................... | 60/497 |
| 2010/0032950 A1 * | 2/2010 | Akervoll | .......................... | 290/53 |
| 2010/0148510 A1 * | 6/2010 | Larivan et al. | .................. | 290/53 |
| 2011/0084488 A1 * | 4/2011 | Eder et al. | ....................... | 290/53 |

* cited by examiner

*Primary Examiner* — Tulsidas C Patel
*Assistant Examiner* — Viet Nguyen
(74) *Attorney, Agent, or Firm* — Henry I. Schanzer

(57) ABSTRACT

A wave energy converter (WEC) includes a float and a spar for guiding the up and down movement of the float in response to the waves. A power take off (PTO) device coupled between the float and the spar and mounted within one of the float and spar such that the PTO includes apparatus responsive to the mechanical interaction of the float with the portion of the spar in proximity to the float for converting their relative motion into useful energy. In one embodiment the PTO includes a linear rack extending along an external portion of the spar and a linear to rotary converter, mounted within the float, including a double sided toothed belt for engaging the rack and causing rotation of the rotary converter to drive an electric generator. In another embodiment the PTO includes tires mounted within the float which rotate as the float moves up and down. In another embodiment the PTO includes a rack and pinion arrangement with one of them connected to the spar and the other mounted in the float.

24 Claims, 16 Drawing Sheets

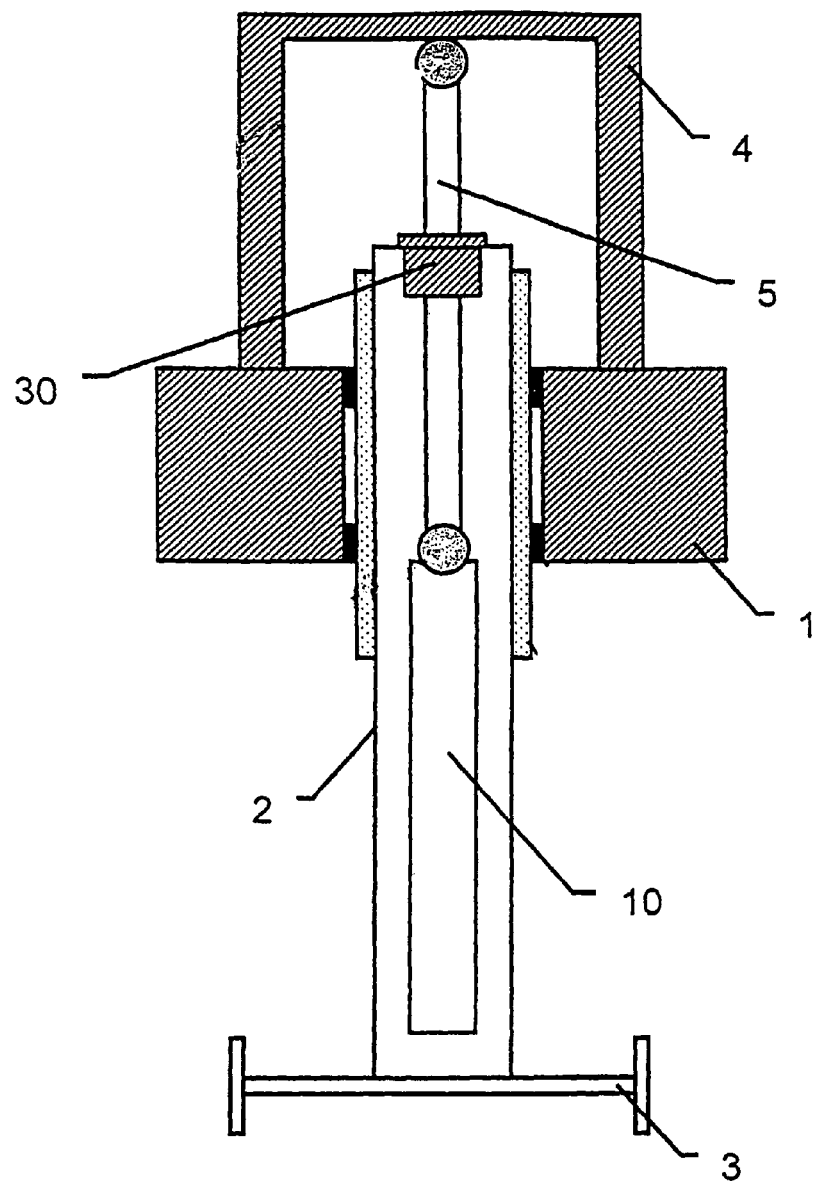
Figure 1 - Prior Art

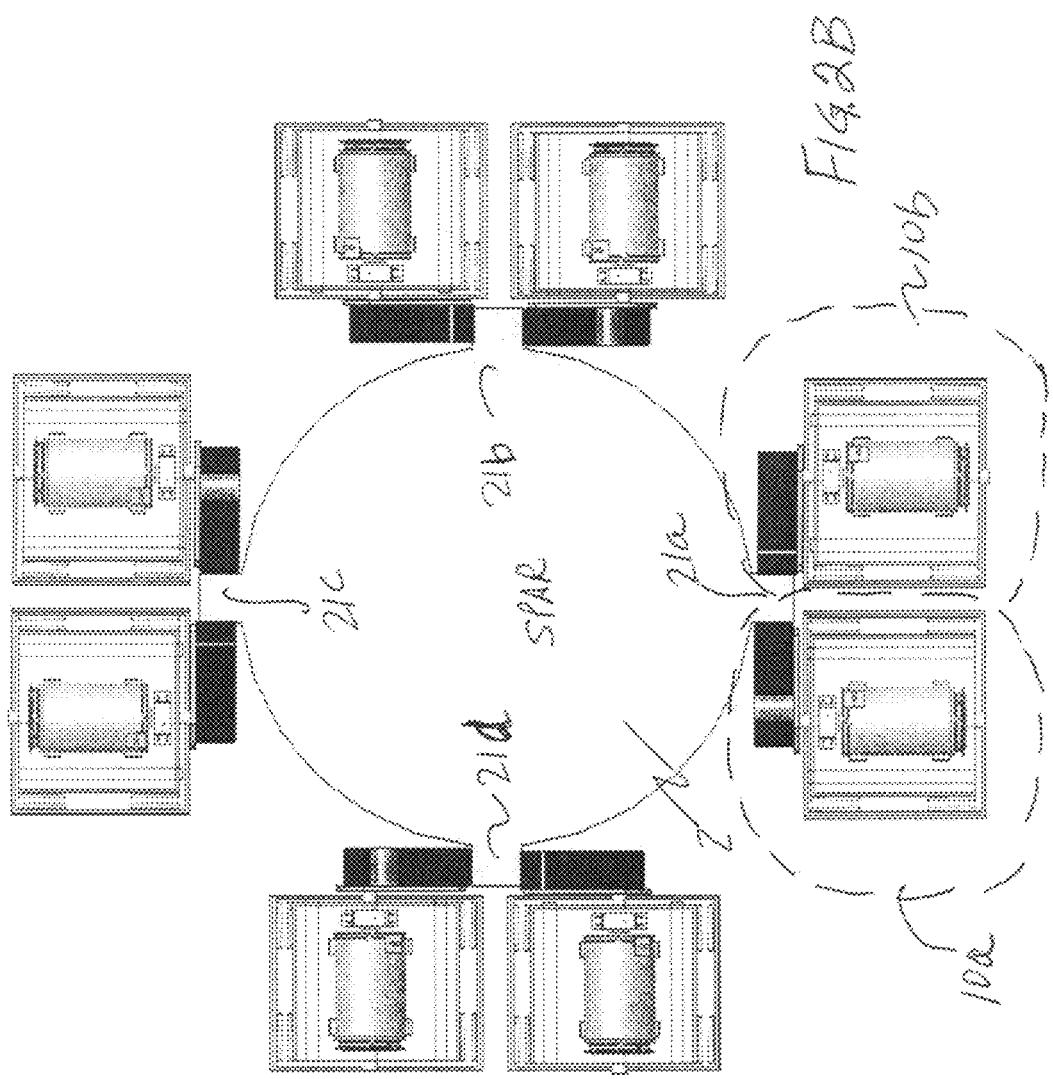

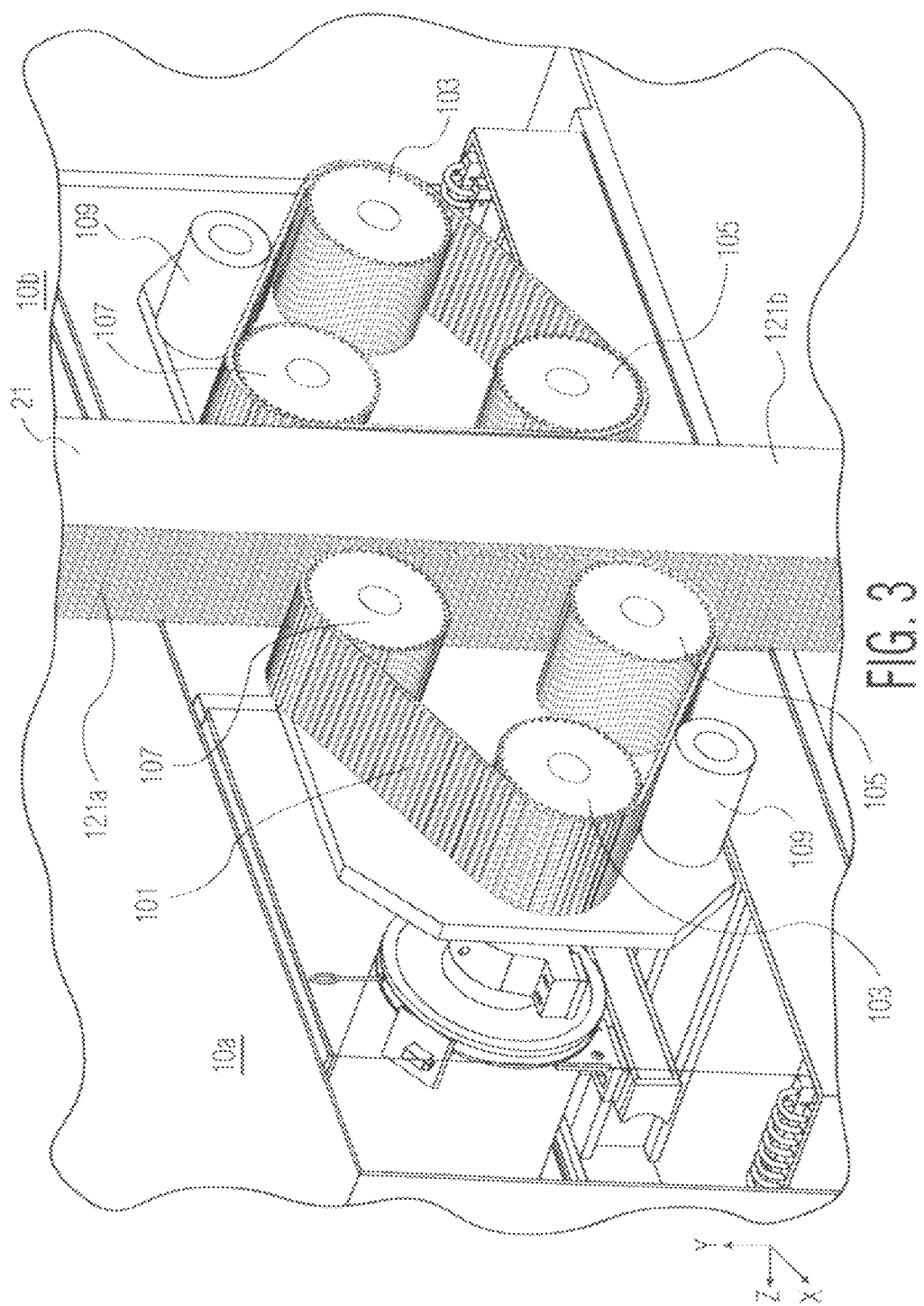

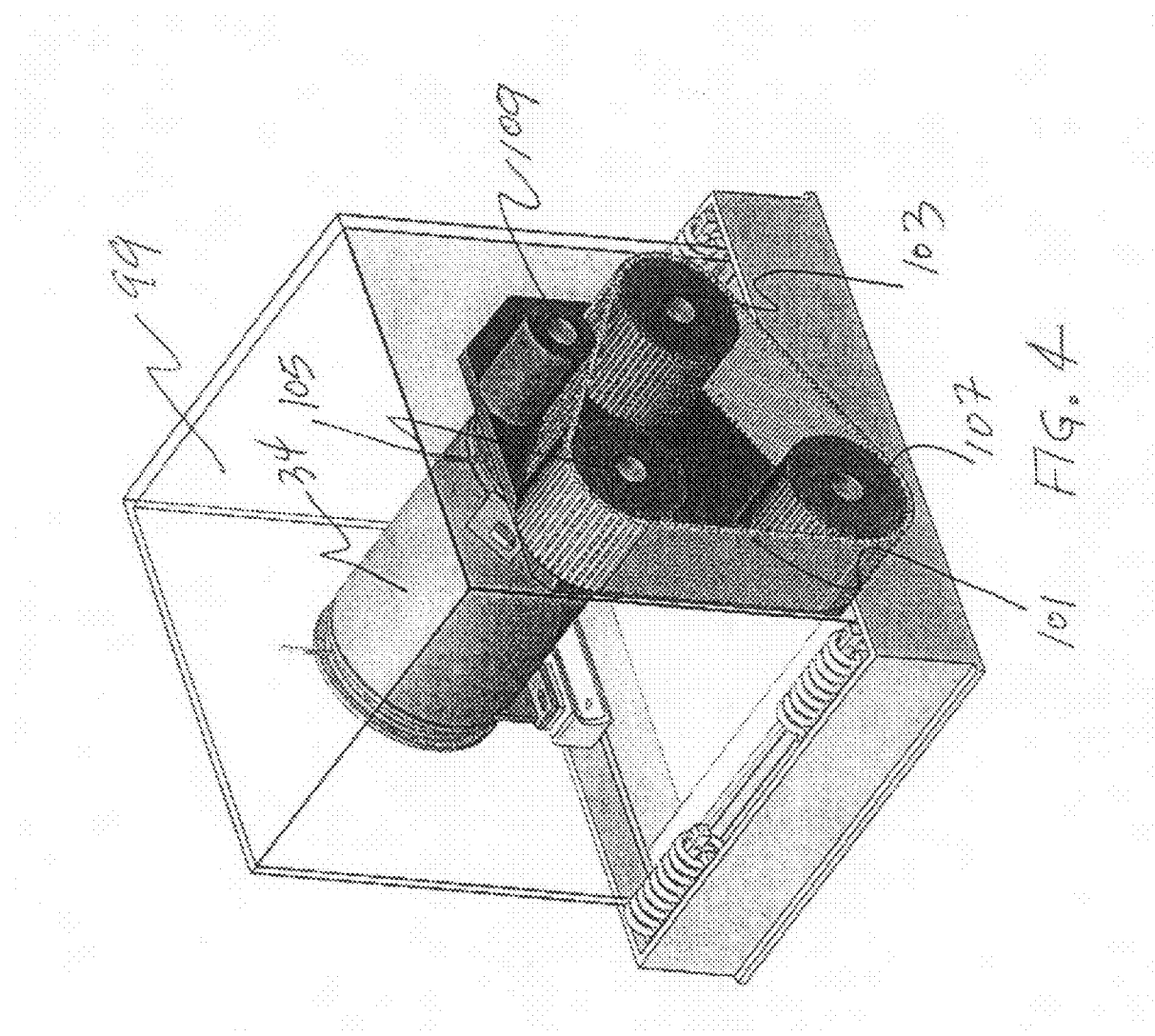

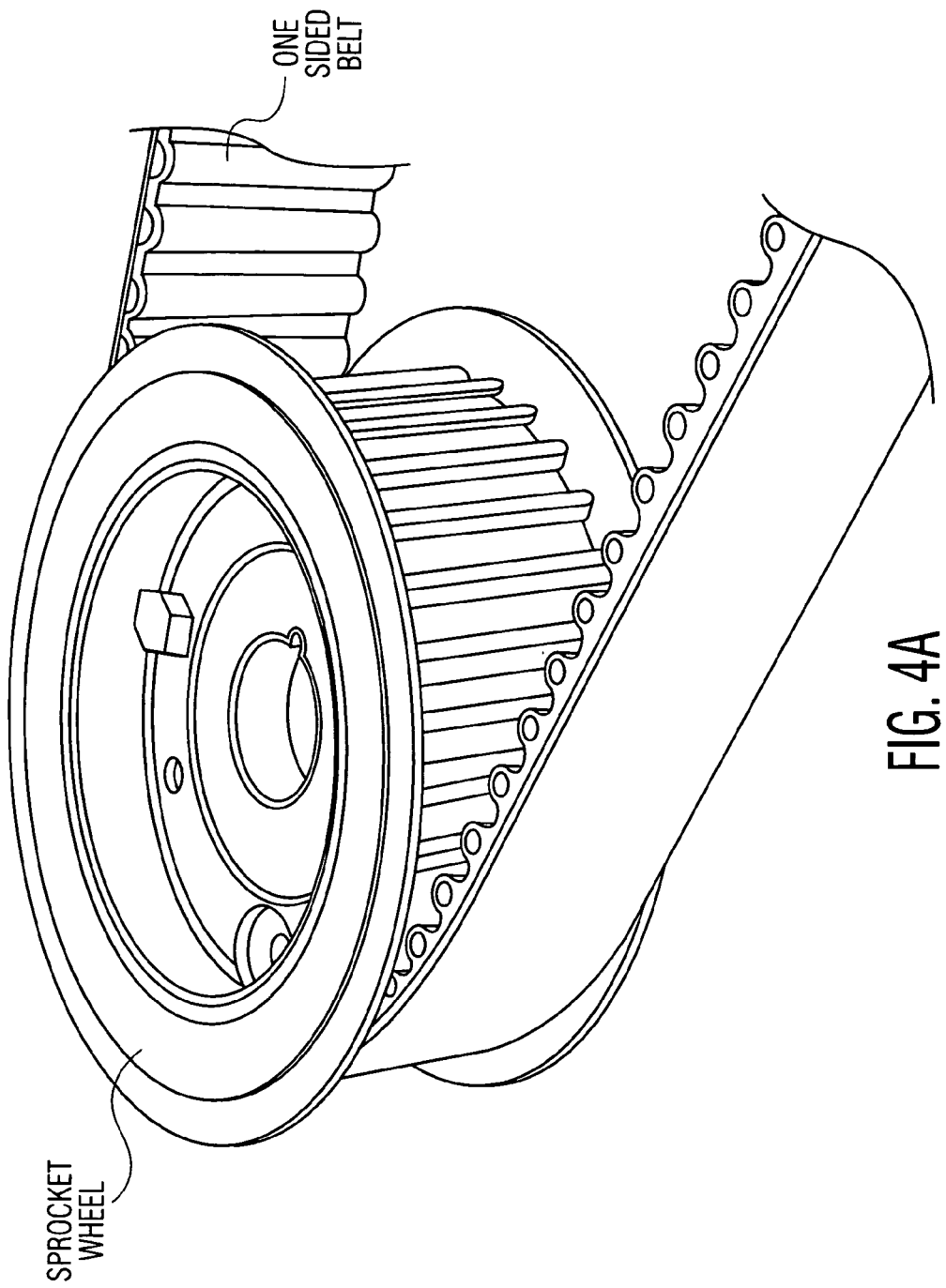

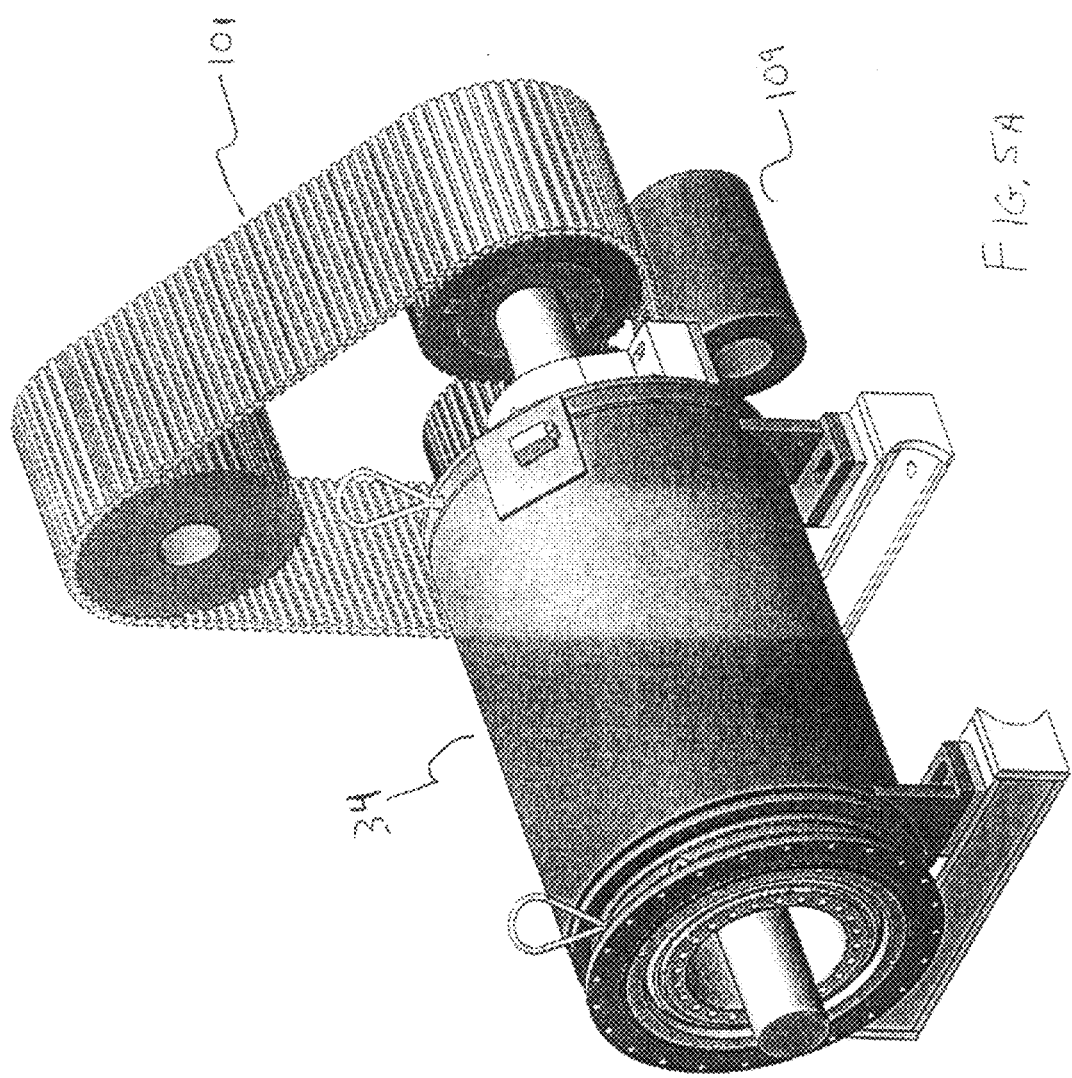

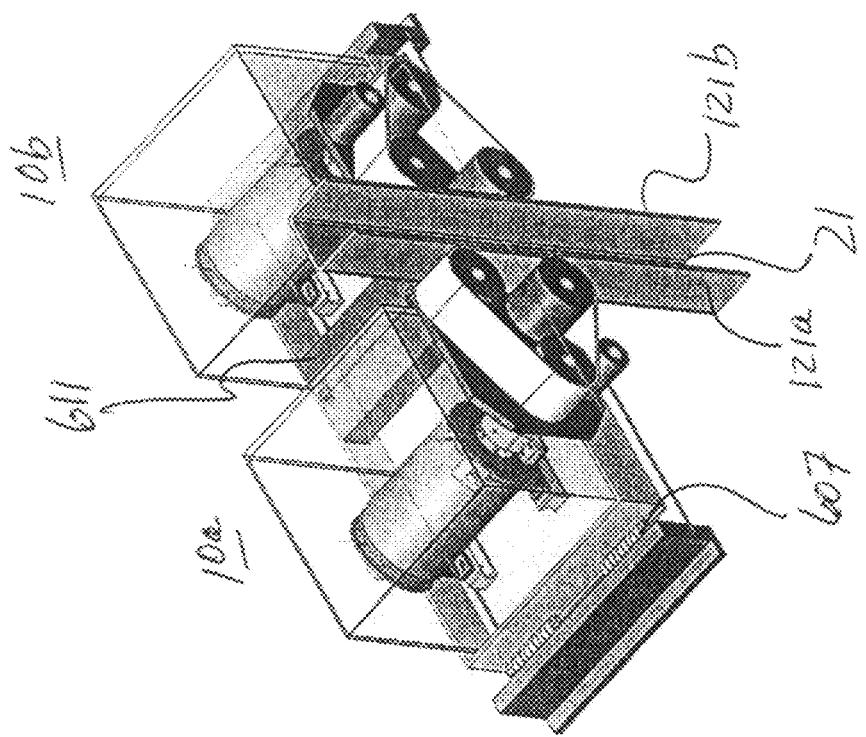

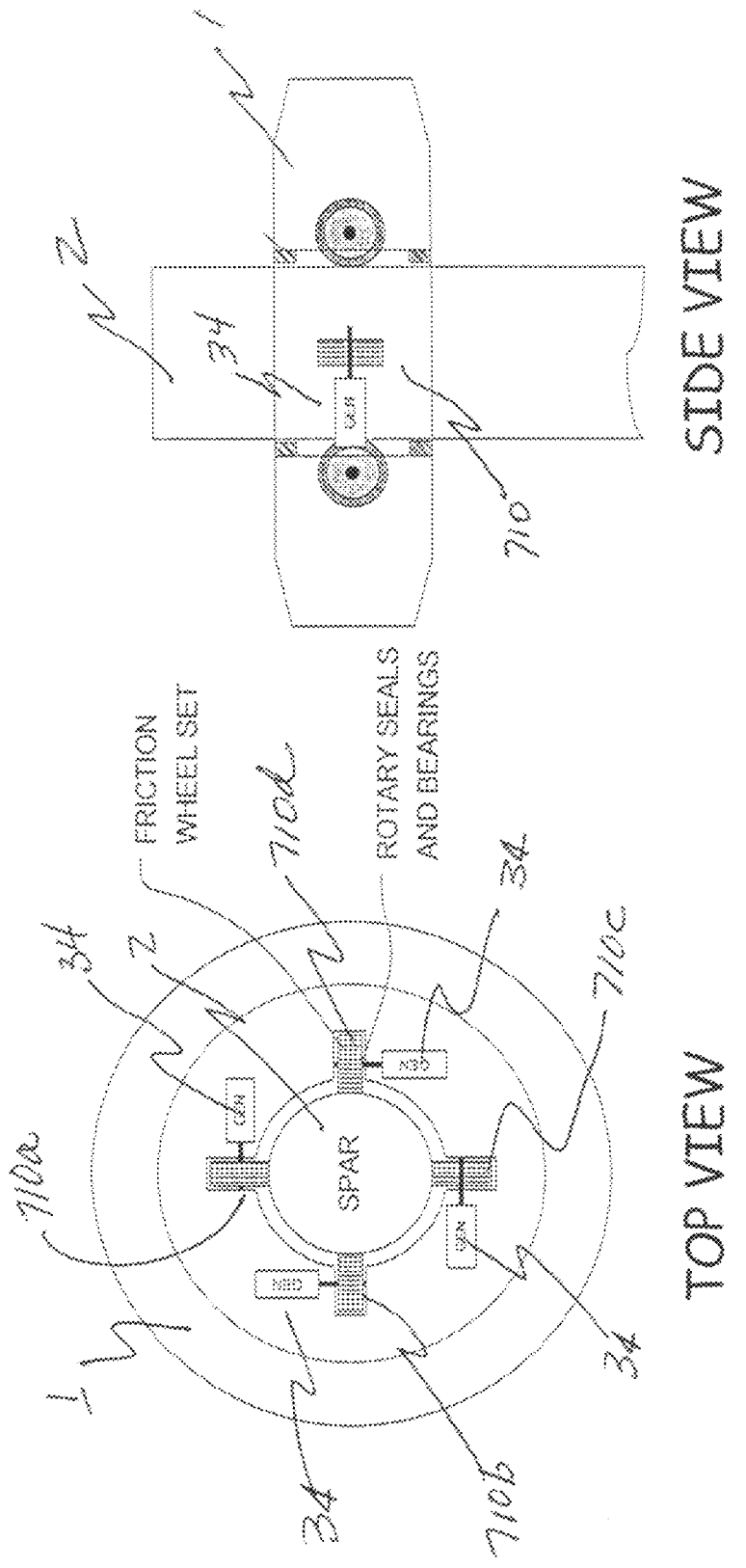

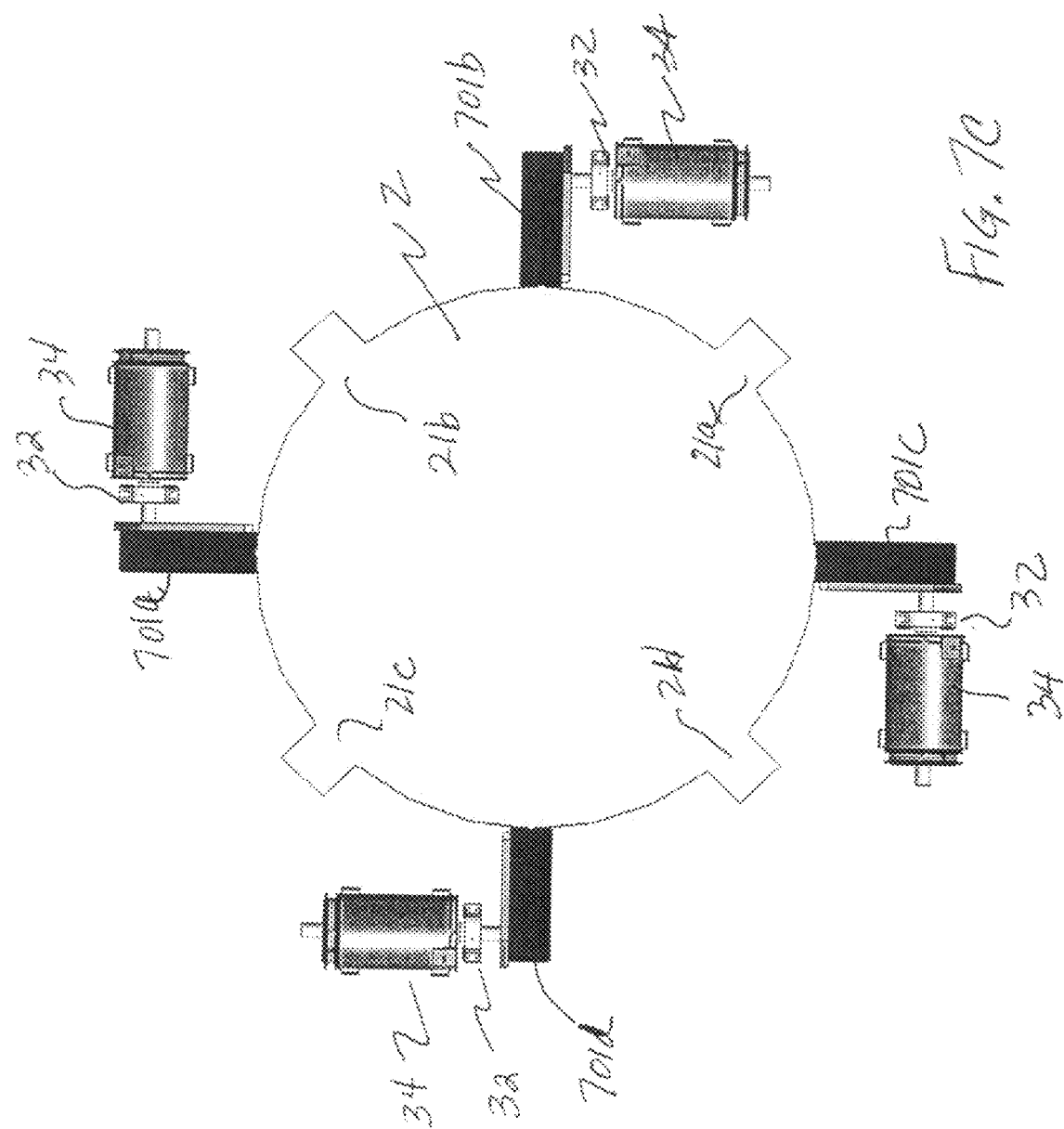

US 8,476,782 B2

WEC WITH IMPROVED POWER TAKE OFF APPARATUS

This invention claims priority from provisional application Ser. No. 61/211,439 filed Mar. 30, 2009 titled POWER TAKE OFF APPARATUS FOR A WEC, and provisional application Ser. No. 61/211,440 filed Mar. 30, 2009 titled POWER TOWER FOR WAVE ENERGY CONVERTER, the teachings of which are fully incorporated herein by reference.

BACKGROUND OF THE INVENTION

This invention relates to improved power take off devices (PTO) for use in wave energy conversion systems (WECs).

In general, WECs include: (a) a float (shell) which moves in phase with the waves; (b) a spar or column which is either stationary with respect to the float or moves out of phase relative to the float; and (c) a power take off device (PTO) coupled between the float and spar to convert their relative motion into a useful form of energy (e.g., electric power).

Many different types of PTOs have been suggested. However, there exists a need to have a PTO which is more efficient, more reliable and more economical than those presently known.

Present WEC technology, as shown in FIG. 1, relies on the float 1 moving along and in phase with the wave surface but guided by the spar 2 which has a submerged end connected to the sea bed or to a heave plate 3 which renders the spar relatively stationary. The relative linear motion between the float and spar is transferred via a bridge 4 through a linear thrust rod 5 to drive a power take-off system 10 located in the spar. As the power take-off system is generally placed inside the spar, a water and air tight chamber needs to be formed within the spar and a linear seal 30 at the top of the spar.

A problem with the present technology is that a linear seal system has to be placed at the top of the spar to interface the thrust rod and ensure that water and air will not enter into the spar. The seal system also serves as a linear bearing system to guide the thrust rod. The linear seal is a weak link in the system because it is extremely difficult to provide a reliable seal of this type. Thus, a goal is to eliminate the need for the linear seal system. It is desirable to replace the linear seal with a rotary seal type system which has had much more extensive development and is generally more reliable.

Another problem with current designs is that the thrust rod needs to transfer the relative linear motion between the float and the spar while interfacing with the linear seal. In addition to generally limiting the length of the stroke, the thrust rod has to handle significant loads in both compression and tension and must also have high wear resistance. The linear thrust rod is one of the most expensive and weakest items in current WEC designs. The thrust rod also has limited scalability in larger systems. It is therefore desirable to replace the thrust rod with a more reliable and economical system The problems with the thrust rod and linear seal are avoided in systems embodying the invention. In contrast to the prior art shown in FIG. 1, in WEC systems embodying the invention the transfer of float motion via a thrust rod is eliminated as well as the need for a linear seal.

SUMMARY OF THE INVENTION

WECs embodying the invention include a float which moves generally as a wave follower and whose up down motion is guided by and along a spar structure. A power take off (PTO) device is coupled between the float and the spar and is mounted within one of the float and spar such that the PTO includes means responsive to the mechanical interaction of the float with the portion of the spar in proximity to the float for converting their relative motion into useful energy. The PTO includes linear to rotary conversion apparatus and includes rotary bearings and rotary seals for driving an electric generator.

In the discussion to follow and in the appended claims, the term "toothed" as applied to a surface of a structure is generally intended to include any cogs, ridges, and/or any type of extensions normal to the surface where their function is primarily for transmitting motion or movement. The term "sprocket" refers to any tooth like projections arranged on a wheel rim to engage other toothed linkages, such as belt, chain, rack, etc. The term "sprocket wheel" (also sometimes simply referred to as a "sprocket") and "gear" may be used interchangeably to refer to a toothed wheel or cylinder or other machine element that meshes with another toothed element to transmit motion or to change speed or direction. A "rack" refers to a toothed bar or rail that is intended to mesh with another toothed linkage or structure.

In accordance with one aspect of the invention a linear rack is formed along an external surface of the spar. A linear to rotary converter device is mounted within the float and includes a toothed rotatable means designed to engage the linear toothed rack formed along the spar to cause rotation of the linear to rotary converter device as the float moves up and down, relative to the spar, in response to wave motion.

In one embodiment of the invention, the toothed rotatable means includes a closed doubled sided belt having teeth on its outer side surface to engage with the rack formed along the spar and having teeth on its inner side surface to engage a sprocket wheel and cause it to turn in response to the up down movement of the float relative to the spar. The sprocket wheel has a shaft coupled to an electric generator for producing an electric output corresponding to the movement of the float/spar.

In another embodiment of the invention, wheeled structures (such as automobile, airplane or multiple bicycle tires) may be rotatably mounted within the float and urged against the spar whereby the wheeled structures rotate along the spar in response to the relative movement between the float and spar. Each wheeled structure includes a shaft connected to an electric generator either directly or via a gear box to increase the speed of rotation of the generator. As the float moves up and down power is generated via rotation of the wheeled structures.

In a still other embodiment, the PTO may include a rack connected along a selected length of the spar (or float) and a rotatably mounted sprocket wheel mounted within the float (or spar). The sprocket wheel is designed to engage the rack whereby the sprocket wheel rotates as the float moves up and down. Electric generators are connected to the sprocket wheel to generate electric power as the sprocket wheels rotate. In a particular embodiment the rack may take the form of a chain wrapped around the sprocket wheels with the ends of the chain being secured to the spar.

Alternatively, the sprocket wheels can be rotatably mounted on, or in, the spar and the chain connected to the float to cause the sprocket wheels to rotate as the float moves up and down. As above, generators are connected to the shafts of the sprocket wheels to generate electric power as the sprocket wheels rotate.

In systems embodying the invention a multiplicity of spar bearing rails may extend from the central spar, each rail having a rack-like structure extending along the rail. A plurality of PTO modules, one or more per rail, may be formed within the float. The advantage of using a plurality of PTO modules is that if any module malfunctions, the remaining modules function to provide power.

In accordance with one aspect of the invention, a pair of PTO modules located on either side of a spar bearing rail may be interconnected to provide balanced operation.

In accordance with an aspect of the invention, the spar may be held stationary by either affixing the spar directly to the sea bed or attaching the spar to a structure affixed to the sea bed. This may be done to enhance power capture and the survivability the WEC to stressful weather conditions. A spar formed to have a long stroke power takeoff mechanism enables the float of the WEC to automatically compensate for tidal variation as well as to be positioned for maintenance and storm survival. That is, the spar may be made long enough to allow for tidal variations without having to move the position of the spar. In addition, if the spar is made sufficiently long so it extends (e.g., 10 meters) above the surface of the water it enables a "park" position for maintenance of the WEC and its positioning below the surface of the water (e.g., 15 meters) for storm survival.

BRIEF DESCRIPTION OF THE DRAWINGS

In the accompanying drawings which are not drawn to scale and in which like reference numerals denote like components:

FIG. 1 is a simplified diagram of a prior art WEC in which the movement of the float is transferred to drive a thrust rod to operate a PTO;

FIG. 2B is a top view of a spar with spar bearing rails and with a simplified drawing of two PTO modules coupled to a spar bearing rail;

FIG. 3 is an isometric drawing of two PTO modules mounted within a float and along a spar bearing rail, in accordance with the invention;

FIG. 4 is an enlarged drawing of an encased PTO module, in accordance with the invention;

FIG. 4A is a simplified isometric drawing of part of a sprocket wheel and meshing belt which may be used in practicing the invention;

FIG. 5A is an isometric depiction of a linear to rotary converter used to practice the invention;

FIGS. 6 and 6A are, respectively, a view from the rear of two PTO modules and a front view of the two modules illustrating that the two modules are located on opposite sides of a bearing rail and apparatus for controlling their movement and for balancing lateral forces;

FIGS. 7A and 7B are, respectively, a top view and a front view of a friction drive PTO system;

FIG. 7C is a slice across the spar and float of a WEC illustrating another aspect of a friction drive PTO system;

DETAILED DESCRIPTION OF THE INVENTION

Figure 2A:
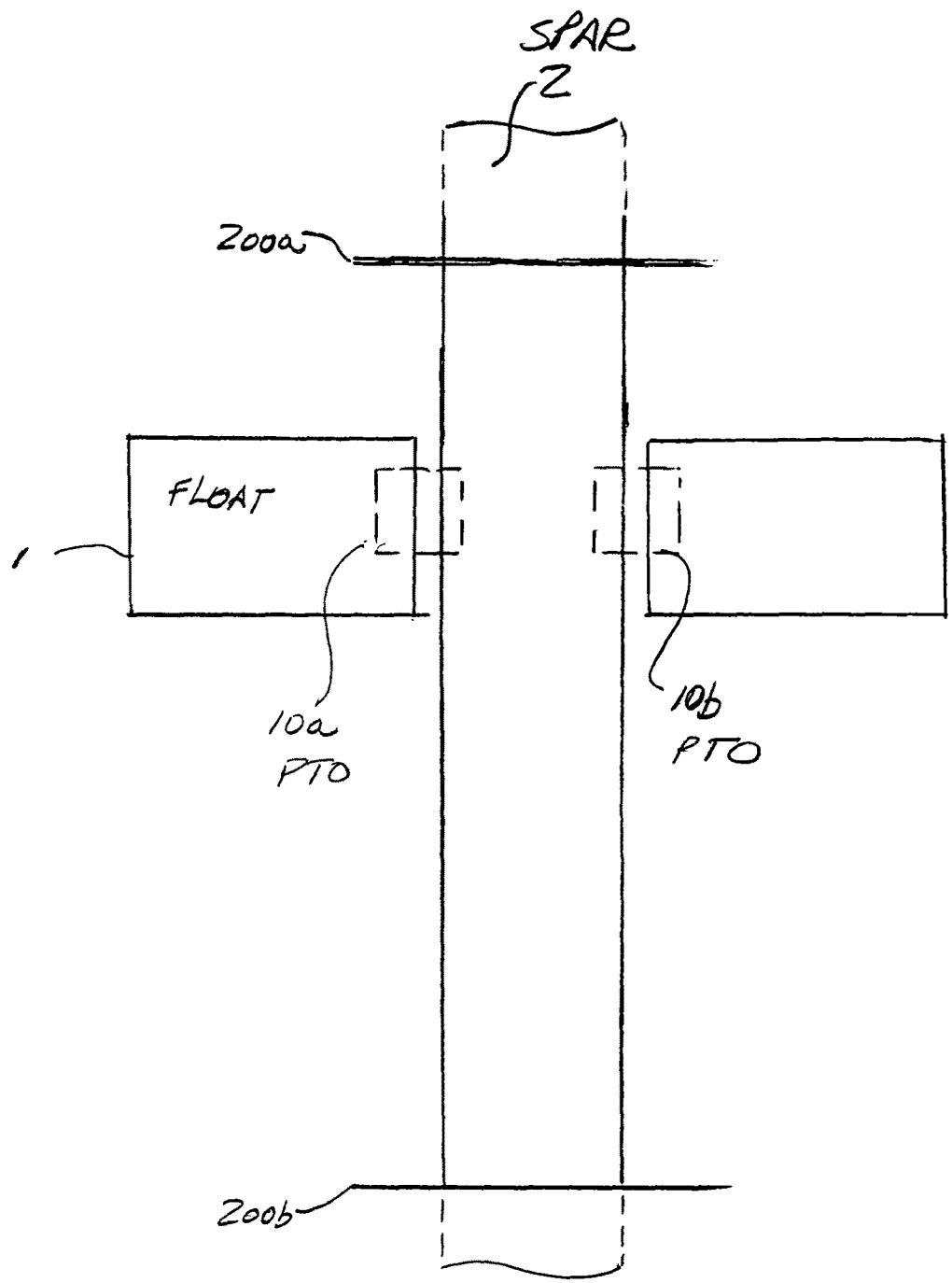
FIGS. 2A and 2C are highly simplified vertical cross sections of a spar, float and PTO configuration used to practice the invention.
Figure 2C:
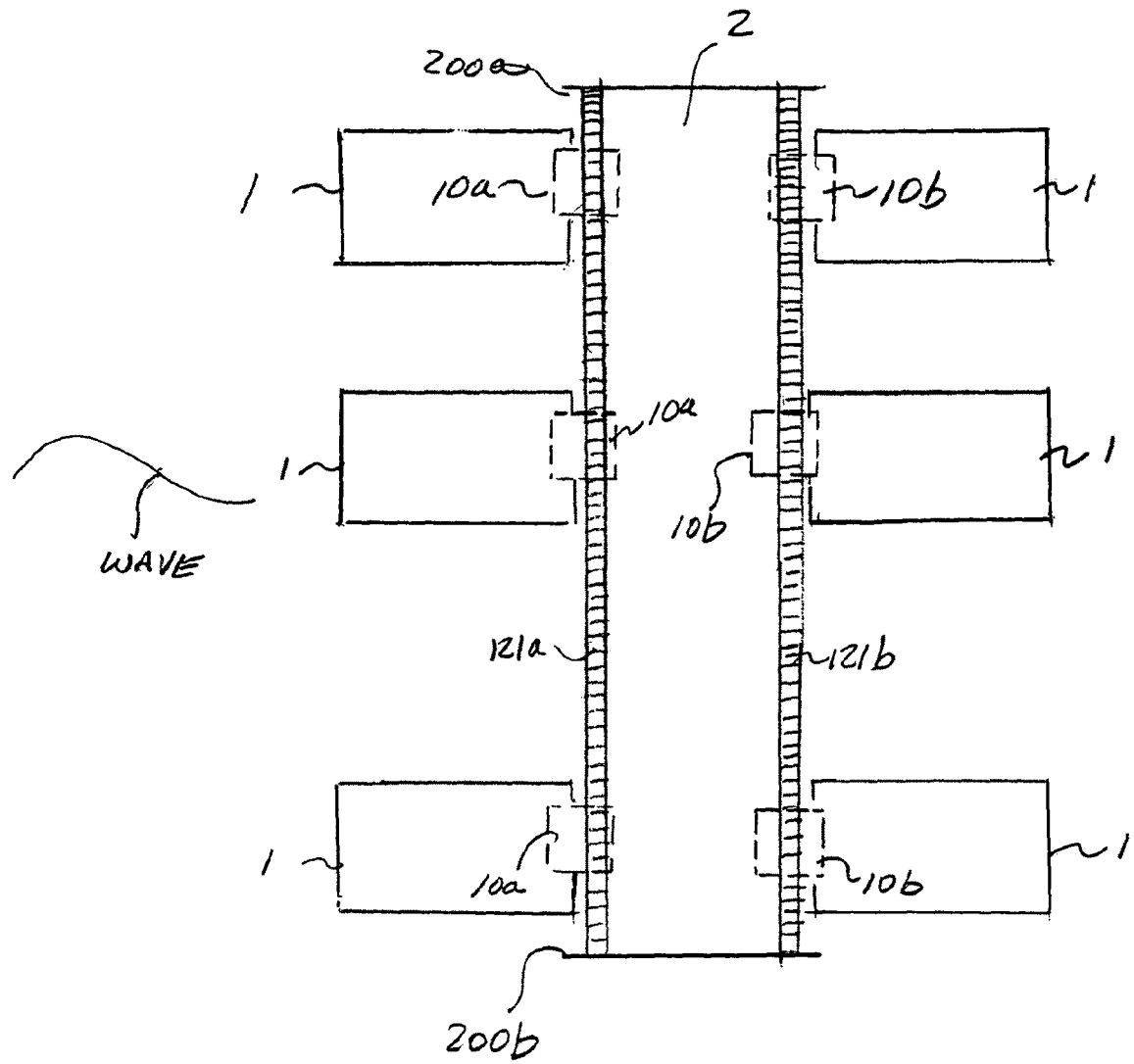

FIGS. 2A, 2B and 2C illustrate a WEC embodying the invention intended to be subjected to ocean waves. FIGS. 2A and 2C show a float 1 guided along a spar 2 with PTO modules 10a, 10b shown directly connected between the float and the spar. In response to the waves, the float can move along the full length of the spar from an upper stop 200a to a lower stop 200b, as illustrated in FIG. 2C. As noted above, there is no transfer or translation of the movement of the float via a bridge and there is no use of a thrust rod or linear seal, as in the prior art. The power take off (PTO) device of the invention may include a plurality of PTO modules (e.g., 10a, 10b) connected between the spar and float. The dashed boxes identified as 10a and 10b between the float and spar, drawn in FIGS. 2A and 2C, are intended to indicate that the PTO modules of the invention react directly to the conditions existing between the float and the region of the spar proximal to the float.

The floating element (the "float") of the WEC is mounted around the spar 2 and may be ballasted to naturally float at the sea surface. The natural buoyancy of the float means it will act as a "wave follower" and therefore naturally move up and down (generally in-phase) with the waves, as the waves pass about the float. The float needs to be robust enough to survive in the marine conditions and therefore may be typically made of steel with compartments inside for buoyancy, ballasting, and to contain elements of the power take off (PTO), if required.

A WEC may be formed by assembling the float and spar on shore and then towing the WEC to a desired location. Alternatively, the float and spar may be towed out separately, the spar may be secured, and the float may then be lifted into position over the top of the spar structure. Alternatively, the float may be made in two halves (or two separate parts) which can be towed out to the site of the spar and then assembled (bolted) around the spar. Bearing rails (e.g., 21a, 21b, 21c and 21d in FIG. 2B or FIG. 7C) may be mounted along the outer surface of the spar with the float designed to travel up and down these rails using bearings to maintain the float in rotational alignment while allowing linear motion.

The bearing rails may also be used as part of the construction of the PTO modules. In accordance with one embodiment of the invention, a spar 2 may be formed, as shown in FIGS. 2B and 2C, with a multiplicity of spar bearing rails (e.g., 21a, 21b, 21c, and 21d) extending from the spar. The opposite facets (e.g., 121a, 121b) of each rail as shown in FIG. 2c or a surface of the rail (or the spar) itself may be used to form a linear rack to which a PTO module can be coupled. FIG. 2B shows two PTO modules coupled along the opposite side of four spar bearing rails. This use of the rails enables the inclusion of a multiplicity of PTO modules (e.g., 10a, 10b per rail) and the continued operation of the WEC as long as one of the PTO modules is operational.

FIG. 3 is a simplified isometric view of two PTO modules (e.g., 10a, 10b) mounted in float 1, designed to go up and down along a spar bearing rail 21. Spar bearing rail 21 has two opposing facets identified as 121a and 121b. These facets may also be referred to as rails. The surfaces of facets or rails 121a, 121b are toothed or notched and their structure and function correspond to those of a rack in a rack and pinion arrangement. By way of example, a corrosion resistant metal such as stainless steel or a non-metallic material may be used to form a linear rack (e.g., 121a, 121b) which can be attached on both sides of the spar bearing rail 21, or the rail 21 may be formed with teeth having the required shape. The teeth of the linear racks (121a, 121b) formed along the rails (e.g., 21a) are designed to engage and cause the rotation of corresponding components mounted in the float. In FIG. 3, the linear racks (121*a*, 121*b*) are intended to mesh with the outer surface of a doubled sided toothed belt 101 wrapped around the sprocket wheels 103, 105 and 107.

The float and spar move generally up and down (i.e., linearly) relative to each other. The apparatus of FIG. 3 transforms their linear motion into rotary motion. In FIG. 3, each PTO module (e.g., 10*a*, 10*b*) includes three sprocket wheels (103, 105, 107) disposed in a triangular arrangement with two of the sprocket wheels (e.g., 105, 107) defining one side of a triangle and a plane generally parallel to the plane of the rack and in close proximity thereto. A two sided toothed belt 101 is wrapped around the sprocket wheels and defines a toothed surface in parallel to the rack surface for the distance generally bounded by sprocket wheels 105 and 107. The belt 101 is held under required tension by means of an idler 109. Virtually the entire surface area of belt 101 extending between sprocket wheels 105 and 107 can then engage the teeth of the rack and transmit a force to the sprocket wheels to cause them to rotate in response to the movement of the float relative to the rack and its spar.

The direction of rotation of the belt and sprocket wheels for the float moving down will be opposite to the direction for the float moving up. Where the PTO modules drive an AC generator whose output is rectified, the change in rotational direction does not affect the power production. If it is desired to have unidirectional rotation, a clutch assembly can be coupled at an appropriate point along the assembly comprising the linear-to-rotary converter, gearbox, and generator.

Figure 4B:
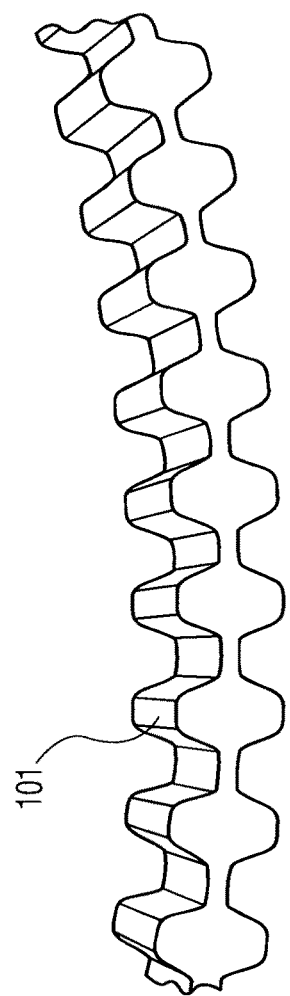
FIG. 4B is a view of a double sided toothed belt used to practice the invention.

Certain features of the PTO module (e.g., 10*a*, 10*b*) encased in an enclosure 99 are shown in greater detail in FIG. 4. An electric generator 34 is shown connected to the shaft of sprocket wheel 103. This is for purpose of illustration only. Any of the other sprocket wheels could have been selected. Also, more than one sprocket wheel could have its shaft driving a generator so that more than one generator could be driven by a PTO module. Details of a sprocket wheel and the engagement of its sprockets (spokes) with the teeth of a belt are shown in FIG. 4A. The sprocket wheel shown in FIG. 4A is flanged to prevent the belt from slipping off the wheel. Also, note that the teeth (cogs or sprockets) of the sprocket wheel are raised to engage and match the teeth of the belt. A double sided toothed belt 101 for use in practicing the invention is shown in FIG. 4B. The belt 101 has an exterior (outer) surface whose teeth are designed to fit into and match the teeth of the rack (e.g., formed on one side of 21*a*). The belt has an interior (inner) surface whose teeth are designed to fit into and match the teeth (cogs or sprockets) of the sprocket wheels. Note that the belt has a substantial width to provide a desired and substantial contact surface area to mesh with the surface area of its corresponding linear rack. An idler 109 is positioned behind the belt to ensure that the belt 101 is appropriately engaged against the bearing rail.

In FIGS. 3 and 4 the sprocket wheels are fixedly mounted on a plate which is rigidly held in place. The sprocket wheels are interconnected in a triangular arrangement, with a base of the triangle facing its corresponding rail and rack. Thus, the belt 101 wrapped around the sprocket wheels meshes with the teeth of the linear rack and rotates clockwise or counterclockwise as the float containing the PTO module moves up or down.

Figure 5:
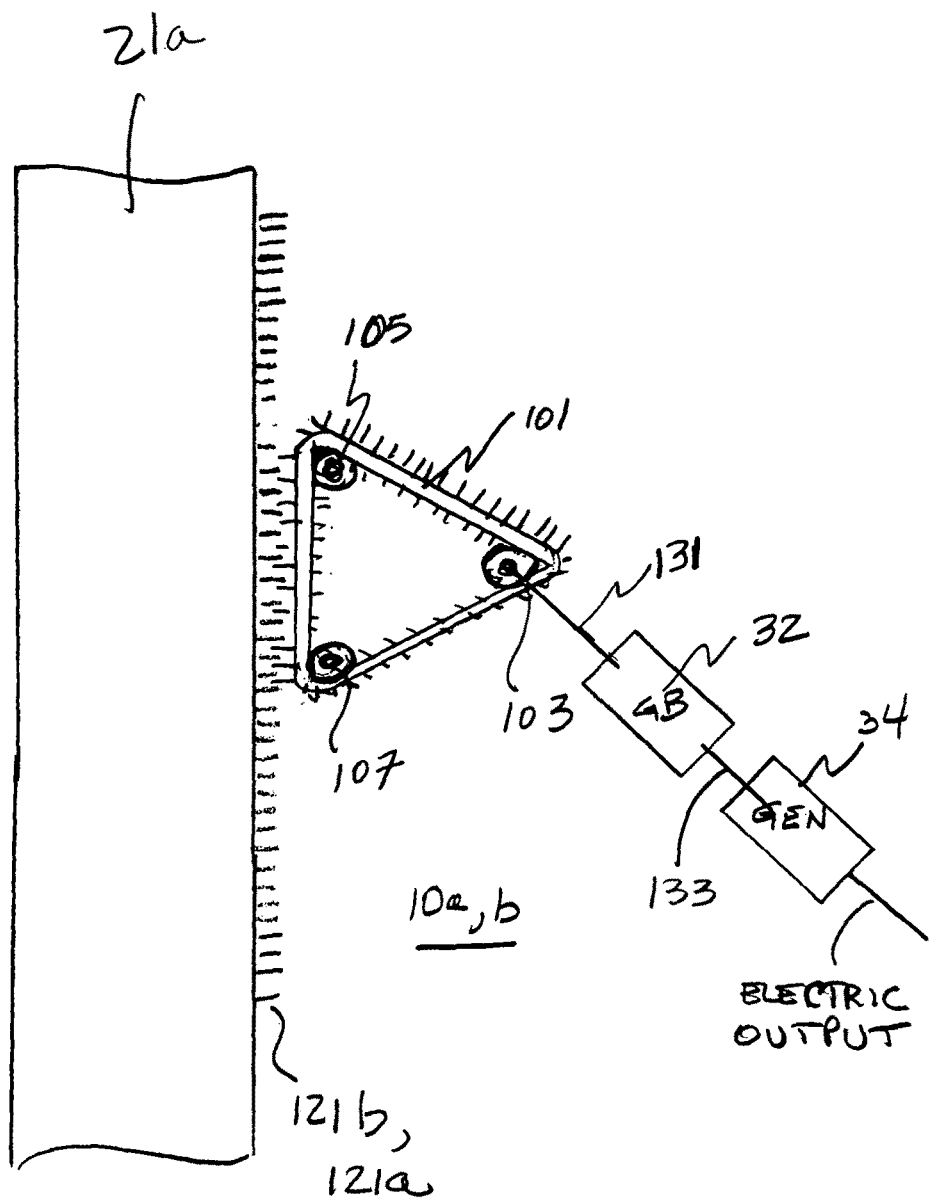
FIG. 5 is a conceptual rendition of a linear to rotary converter embodying the invention driving a gear box and a generator.

As shown in FIGS. 5 and 5A, the linear to rotary converter apparatus (sprocket wheels 103, 105, 107 and belt 101) is operated such that at least one of the sprocket wheels (e.g., 103) has a shaft 131 which is coupled to a gear box 32 which in turn has a shaft 133 connected to the shaft of an electric generator 34. Each sprocket wheel could have a like combination connected to its shaft. As noted above, the gear box is used to increase the speed of rotation of the shaft 133 driving the electric generator. Any suitable generator may be used to practice the invention. The operation of the generator is known in the art and need not be detailed. A wide range of generators may be used to practicing the invention. Where a generator does not need to be driven at higher speeds to achieve desired operation the gear box may be eliminated.

Note that the generator may also be operated as a motor. As the float moves up and down, in response to the waves, the WEC is used to drive the generator to generate electric power (the generator mode) power will be captured and converted as the float moves up and down. Alternatively, the generator/motor can be operated as a motor (the motor mode) and the motor can then be used to drive the float up to the maintenance position or down to a level which is free of waves and defined as the storm position. The motor/generator can also be used in the motor mode for testing, or to drive power back into the float to establish resonance and therefore optimum power capture.

Figure 6:
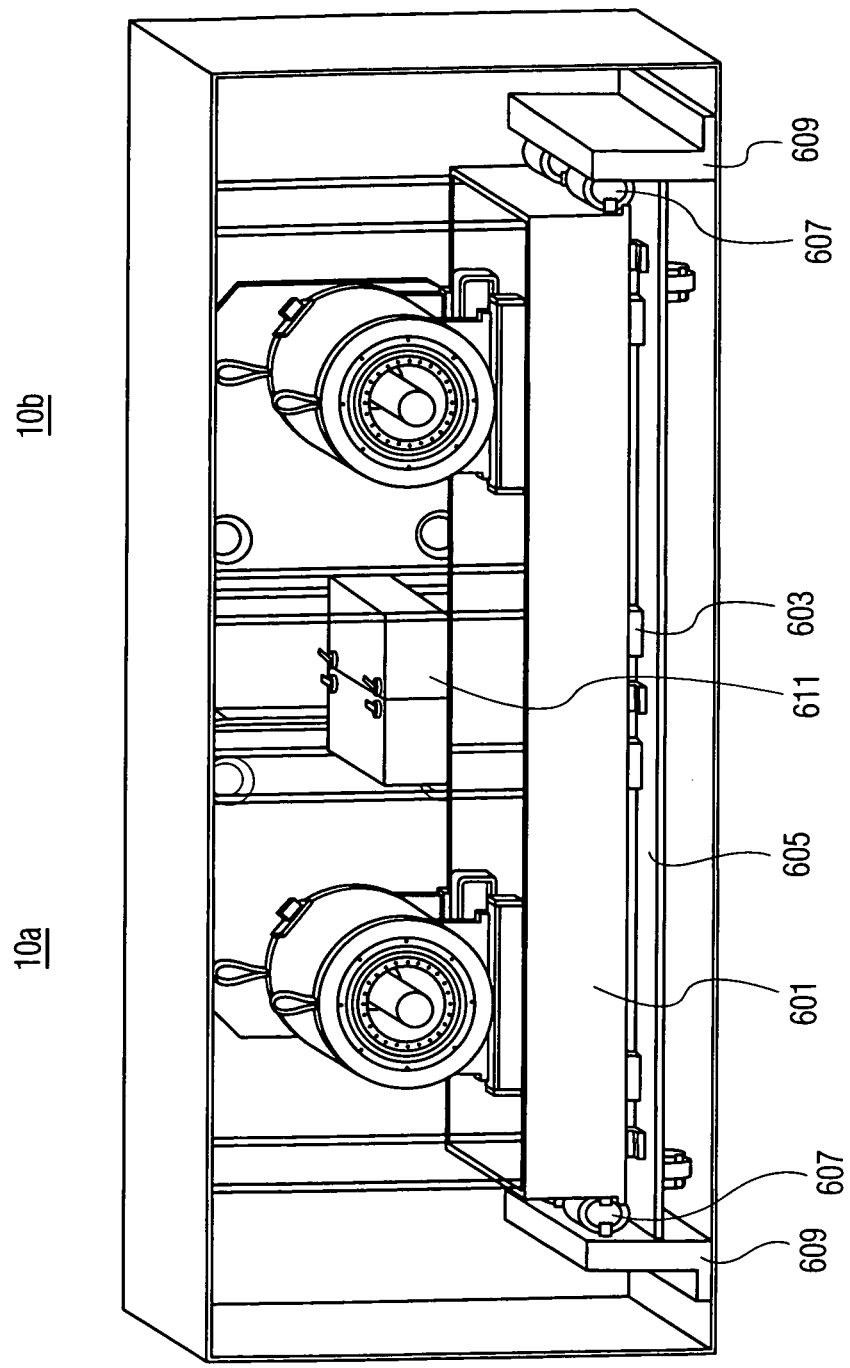

For proper operation of the system, it is desirable to maintain the teeth of a module's belt 101 engaged with the teeth of its corresponding rack (e.g., 121*a*, 121*b*) or rail. FIGS. 6 and 6A show some of the details for mounting the modules and for achieving a degree of balance in their operation. FIG. 6 which is a rear view of the back of two PTO modules (e.g., 10*a*, 10*b*) and their enclosures and FIG. 6A which is a font view of these two PTO modules illustrate that the two modules hug their respective sides (e.g., 121*a* and 121*b*) of a rail (e.g., 21). The mounting of the modules and the interconnection of two modules located on either side of a spar rail enables good engagement and balanced operation. The two PTO modules are positioned on a platform 601 which is mounted via a suspension system/bearings 603 to a base 605 secured to the float. The two modules are located on opposite sides of a bearing rail (e.g., 21*a*). The platform system is equipped with suspension springs (or shock isolators) 607 between the modules and end stop 609 to accommodate the relative motion between the float and the spar when the float is moving along the spar. Each PTO module is also allowed to limitedly slide laterally within the PTO platform. The two PTO modules are linked with a pre-loading spring device 611 to pull these two modules together and apply constant pressure against their common bearing rail. Since both modules can slide on the platform, all the pressure applied on the bearing rail will be balanced out (cancelled out) between these two modules. This closed-loop force system will not transfer the local pressure (force) to the overall float system but can ensure that the contact pressure on the bearing rail surfaces between these two modules is identical.

FIGS. 7A, 7B, and 7C are directed to illustrate aspects of a PTO system using friction drive. FIG. 7A is a top view of 4 sets of tires (710*a*, 710*b*, 710*c*, 710*d*) mounted within a float 1 and hugging a spar 2. FIG. 7B is a frontal cross-sectional view of the PTO system of FIG. 7A, showing the tires within the float. FIG. 7C is similar to FIG. 7A but shows the use of spar bearing rails (21*a*, 21*b*, 21*c*, 21*d*) to enable the up down motion of the float relative to spar while limiting any rotational or twisting movement between the two. Forces are applied to the tires to maintain appropriate traction to keep them rolling against the spar. Tires are shown for purpose of illustration only; they could be virtually any device which can rotate about an axle or shaft. The tires have a shaft to which is attached a generator/motor 34. As the float moves up and down, the tires can and do rotate along the length of the spar. The rotation of the tires, which are connected directly or via gearboxes to motor/generator assemblies 34 generates power at the output of the generators. These motor/generator assemblies can also be used in a "motor" mode to drive the float up to maintenance position or down into storm position. The pneumatic inflation of the tires also gives natural protection from shock loading, and the number of tires allows for failures of individual tires or drives to not affect the operation of the overall power generator.

Figure 8:
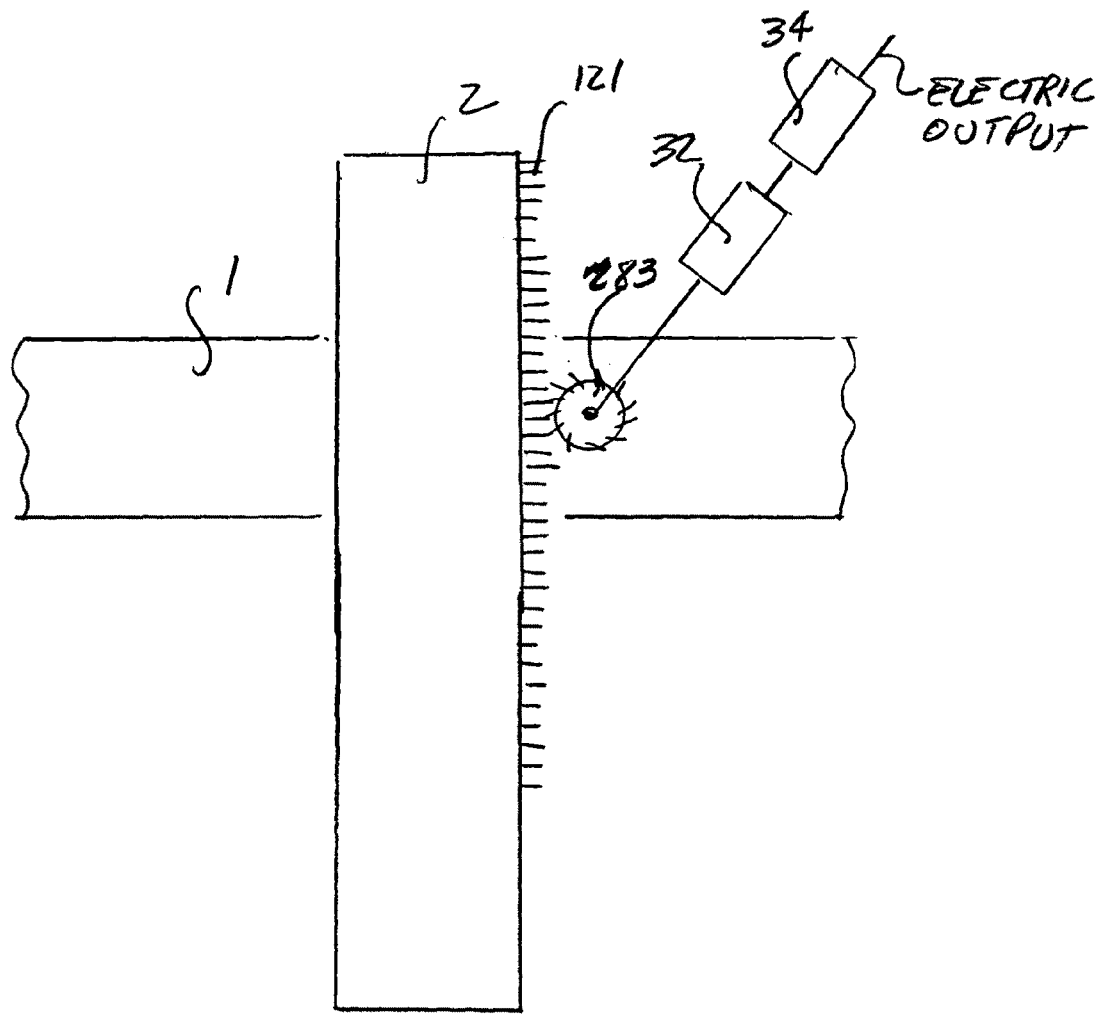
FIG. 8 is a highly simplified cross-sectional diagram of a PTO with a rack and pinion like system embodying the invention.

FIG. 8 shows what is essentially a rack and pinion system for practicing the invention. A rack 121 may be formed directly within and along the outer surface a spar. A rack (or a chain link or a toothed belt) structure 121 may be formed independently of the spar 2 and then attached to an outer surface of the spar and/or along a spar bearing rail. A sprocket wheel 283, which function as a pinion is mounted within the float 1, but is positioned to ensure positive engagement with the teeth of rack 121. The sprocket wheel has a shaft connected to a gear box 32 whose shaft is connected to that of a generator 34. In FIG. 8 these components are all mounted in the float. When the float moves up and down relative to the spar the sprocket wheel rotates and drives the generator. The rack is positioned along an exterior surface of the spar (or a facet of a spar bearing rail) and the sprocket wheel with its shaft coupled to a gear box is positioned within the float. Alternatively, the rack could be mounted on the float and the sprocket wheel on or within the spar.

The rack of FIG. 8 (and of the other embodiments) may be replaced with a chain whose links function as the teeth of the rack.

A chain (or belt) may be formed along the spar (replacing the rack of FIG. 8) and wrapped around sprocket wheels. In such an embodiment a pre-tensioned roller chain or conveyor chain is used with sprocket wheels and idlers. The shaft of the generator and/or gear box will share with a sprocket which is engaged with the chain. When the float moves up and down the sprocket wheel is rotated and drives the generator and/or gear box.

The embodiments discussed in this application show a rack connected to external surfaces of a spar and the rotating members and power generating equipment mounted in the float. However, it should be appreciated that a WEC may be designed with the rotating members and the power takeoff (PTO) components in the spar and the linear rack mounted along the float, or some combination of both.

WECs embodying the invention may be designed for operation in shallow water or in deep water. In one embodiment the spar is designed for typical sea water depths of 20 to 50 meters and attached to the seabed by a fixed monopole or tripod or truss structure. The spar may, for example, be 4.5 m in diameter and very similar to that used by the offshore wind industry. Such a spar is cheap to fabricate and simply installed by driving into the seabed using an appropriate piling hammer. However this option to date has only been used for depths up to 20-25 m and relies on a sandy or muddy seabed.

Figure 9:
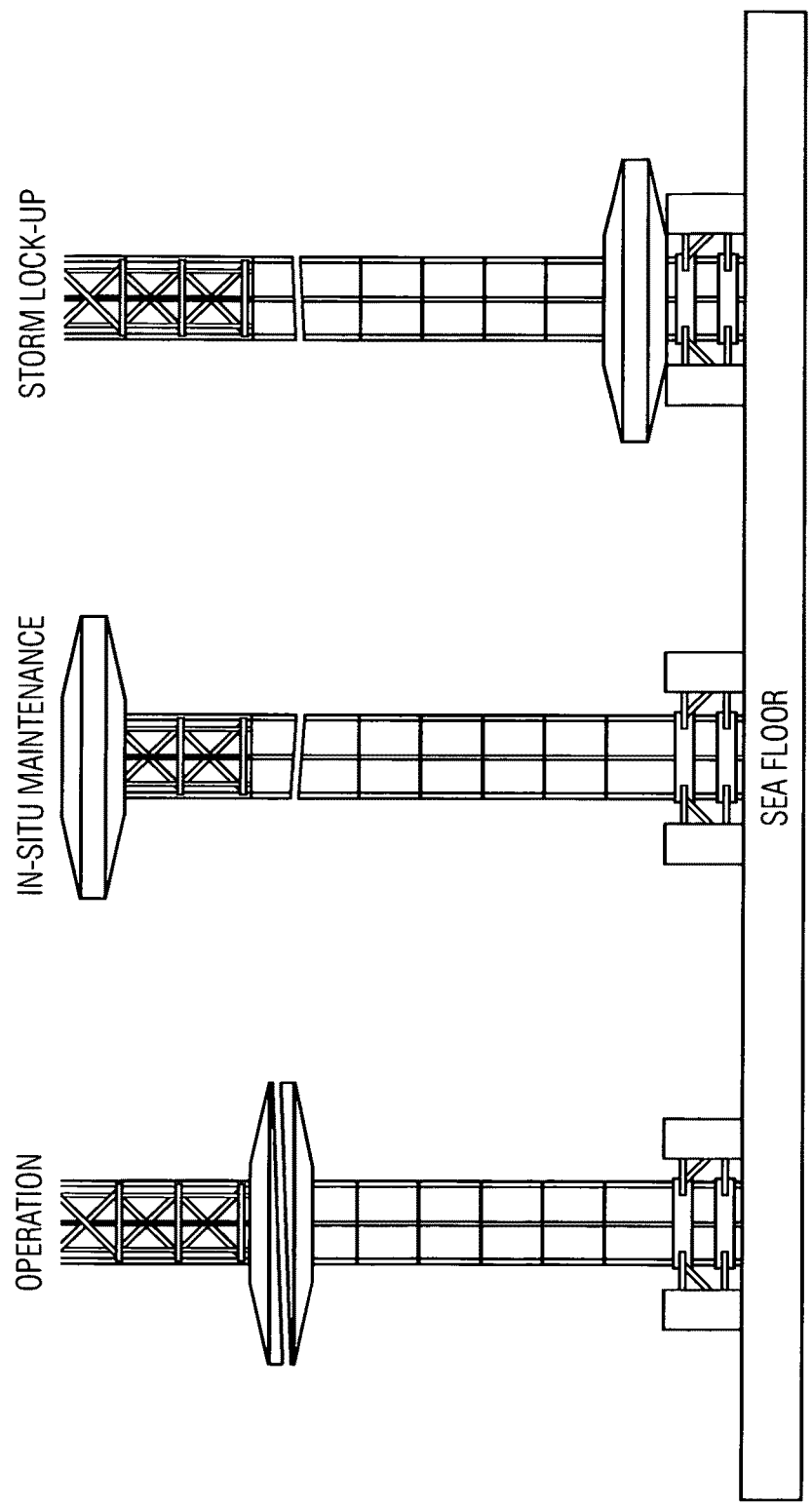
FIG. 9 shows a WEC structure which may be used to practice the invention.

As shown in FIG. 9, for water depths greater than 25 m and/or sea bottoms unsuitable for a pile, a tripod or other fixed structure may be used as the foundation element to create a fixed base and maintenance platform onto which the WEC is mounted. The structure may simply be held on the bottom by gravity or gravity anchors or pinned down by small piles which may be grouted in place on the seabed. The structure of the tripod may be manufactured from conventional steel as regularly used in the marine and offshore industry. Alternatively, sleeves/ducts may be attached to the sea bed, the height of the sleeve/duct being and its opening being sufficiently high and wide to enable a spar to be reasonably fitted and secured within the sleeve/duct.

Maintenance of a WEC may be accomplished by simply lifting the float clear of the water. In such a case, the float may be driven to this position using the PTO mechanism acting in reverse, or by a separate lifting mechanism. Once in an elevated maintenance position, the float may be locked in place and then all power can be isolated, allowing safe working on elements of the PTO in the spar or the float. Access to the top of the spar may be provided by a ladder set into the side of the spar, and climbing up through a clearance tunnel between the float and spar. Once access is gained to the top of the spar, manholes allow access to PTO components within the spar and also within the float which has its maintenance position just below the top of the spar, allowing safe and easy access. If the spar is held fixed and the float locked to it, the equipment is not subject to movement and maintenance workers can more easily do their maintenance/repair work. This provides more reliable and easy access which is not subject to a wide range of sea conditions.

The WEC system may be designed to accommodate storm conditions in 3 phases:

1) For normal and large waves within an expected range, the float is allowed to continue to move up and down along the spar, and power is still captured. If the PTO fails or there is no grid connection, the float can continue to move (or "freewheel") in this position provided there is no chance of the end stops being hit, which are placed at each end of the total travel of the float.

2) For larger waves (seas) than above, where the float is on maintenance, or it is not set to submersion, the float may be elevated to the maintenance position, where it can safely weather most normal storms. However, for still larger waves, defined as a storm condition, the float may be submerged.

3) Submergence of a float below the sea surface to a depth which will make it safe from a storm (e.g., 10-15 meters below the surface). At that level, the power of the waves, and especially the impulse forces, are considerably lessened. The submersion of the float may be carried out in a controlled fashion using the PTO to drive the float down until it is latched in a "storm" position. Emergency provision may be also included, so if the float cannot be driven down for any reason, it is simply flooded with water, causing it to sink down on to the bottom end-stops, where it will safely remain until the storm has passed, the water pumped out, and the float returned to normal operation.

Thus, in accordance with one aspect of the invention, the spar may be made long to: (a) reduce the issue and problem of the float regularly hitting end stops; (b) enable a parked maintenance position above the sea level, and (c) enable the float to be submerged to survive storms.

However, it should be understood that the PTO devices and systems embodying the invention may be practiced with WECs where the spar is either floating or stationary.

A feature of the invention is that the PTO relies on a rotary mechanical driving mechanism and includes rotary bearings and rotary seals. Therefore, the need for a thrust rod or for linear seals is eliminated. The advantages of the invention therefore include, but are not limited to: the use of lighter components than those used in a mechanical rigid-linkage linear driving system; the use of rotary bearings and rotary seals which are more developed and reliable than linear seals; and the elimination of the expensive and unreliable thrust rod. The gear boxes make it possible to operate the generators at a higher speed and more efficiently. The components of the PTO may be modular enabling in-site maintenance and replacement.

What is claimed is:

1. A wave energy converter (WEC) comprising:
a float for moving up and down in phase with the waves;

a spar for guiding the up and down movement of the float; the spar having an upper portion and a lower portion with the float moving between the upper and lower portions in response to the waves; and a power take off (PTO) device coupled between the float and the spar responsive to the mechanical interaction of the float with the portion of the spar in proximity to the float for converting their relative motion into useful energy, wherein the PTO includes:

(a) a rack extending vertically along an external portion of the spar; and (b) a linear to rotary converter, mounted within the float, including a toothed member for engaging the rack and causing rotation of the rotary converter as a function of the up and down motion of the float relative to the spar and wherein the linear to rotary converter includes: (i) at least two sprocket wheels disposed so as to define a plane generally parallel to the plane of the rack and in close proximity thereto; and (ii) a two sided toothed belt wrapped around the sprocket wheels for engaging the teeth of the rack and causing the sprocket wheels to rotate in response to the movement of the float relative to the rack and its spar.

2. A WEC as claimed in claim 1 wherein the linear to rotary converter is coupled to an electric generator to produce electrical energy.

3. A WEC as claimed in claim 2 wherein the generator is coupled to the linear to rotary converter via a gear box tending to increase the rotational speed of the generator.

4. A WEC as claimed in claim 1, wherein the linear to rotary converter includes a two sided toothed belt having an outer side and an inner side, the teeth on the outer side for engaging with the rack and the teeth on the inner side for engaging with a sprocket wheel and causing it to rotate as a function of the up and down motion of the float relative to the spar.

5. A WEC as claimed in claim 1, wherein the linear to rotary converter includes means for maintaining tension in the belt and means for maintaining it engaged with its corresponding rack.

6. A WEC as claimed in claim 1, wherein the linear to rotary converter includes: (a) at least three sprocket wheels disposed in a triangular arrangement with two of the sprocket wheels defining one side of the triangle and a plane generally parallel to the plane of the rack and in close proximity thereto; and (b) a two sided toothed belt wrapped around the sprocket wheels for engaging the teeth of the rack and causing the sprocket wheels to rotate in response to the movement of the float relative to the rack and its spar.

7. A WEC as claimed in claim 6, wherein at least one of the sprocket wheels is coupled to a generator to produce electrical energy.

8. A WEC as claimed in claim 6, wherein the linear to rotary converter includes means for maintaining tension in the belt and means for maintaining it engaged with its corresponding rack and spar.

9. A WEC as claimed in claim 8, wherein the PTO device coupled between the float and the spar for converting their relative motion into useful energy includes a rack and pinion system mounted within the WEC such that the pinion rotates as a function of the up and down motion of the float relative to the spar.

10. A WEC as claimed in claim 1, wherein the PTO device coupled between the float and the spar for converting their relative motion into useful energy includes:

a plurality of wheeled structures fixedly mounted within the float with the outer portion of the wheeled structures in contact with the spar so as to rotate in response to the up down motion of the float; and each of the wheeled structures having a shaft which rotates correspondingly and which is connected to the shaft of a generator.

11. A WEC as claimed in claim 10, wherein the wheeled structures are tires.

12. A WEC as claimed in claim 1, wherein the spar includes a plurality of spar bearing rails extending from and along the length of the spar; and wherein the PTO includes a plurality of PTO modules; each module including (a) a rack extending vertically along a rail; and (b) a linear to rotary converter, mounted within the float, including a toothed member for engaging a corresponding rack and causing rotation of the rotary converter as a function of the up and down motion of the float relative to the spar.

13. A WEC as claimed in claim 1 wherein the spar includes a plurality of spar bearing rails extending from and along the length of the spar each spar rail having two opposite sides; and wherein the PTO includes a plurality of PTO modules; each module including (a) a rack extending vertically along both sides of a rail; and (b) a linear to rotary converter per rack, mounted within the float, including a toothed member for engaging a corresponding rack and causing rotation of the rotary converter as a function of the up and down motion of the float relative to the spar.

14. A wave energy converter (WEC) comprising:

a float extending along the surface of a body of water for moving up and down in phase with the waves;

a spar for guiding the up and down movement of the float; the spar having an upper portion and a lower portion with the float moving between the upper and lower portion in response to the waves; and a power take off (PTO) device coupled between the float and the spar for converting their relative motion into useful energy including:

(a) a rack extending vertically along an external portion of one of the spar and float; and (b) a linear to rotary converter, mounted within the other one of the float and spar, including a toothed member for engaging the rack and causing rotation of the rotary converter as a function of the up and down motion of the float relative to the spar; and wherein the linear to rotary converter includes: (a) at least two sprocket wheels disposed so as to define a plane generally parallel to the plane of the rack and in close proximity thereto; and (b) a two sided toothed belt wrapped around the sprocket wheels for engaging the teeth of the rack and causing the sprocket wheels to rotate in response to the movement of the float relative to the rack and its spar.

15. A WEC as claimed in claim 14 wherein the linear to rotary converter is coupled to an electric generator to produce electrical energy.

16. A WEC as claimed in claim 15 wherein the generator is coupled to the linear to rotary converter via a gear box tending to increase the rotational speed of the generator.

17. A WEC as claimed in claim 14, wherein the linear to rotary converter includes a two sided belt having an outer side and an inner side, said belt having teeth on its outer side and internal side, the teeth on the outer side for engaging with the rack and the teeth on the inner side for engaging with a sprocket wheel and causing it to rotate as a function of the up and down motion of the float relative to the spar.

18. A WEC as claimed in claim 14, wherein the linear to rotary converter includes means for maintaining tension in the belt and means for maintaining it engaged with its corresponding rack.

19. A WEC as claimed in claim 14, wherein the linear to rotary converter includes: (a) at least three sprocket wheels disposed in a triangular arrangement with two of the sprocket wheels defining one side of the triangle and a plane generally parallel to the plane of the rack and in close proximity thereto; and (b) a two sided toothed belt wrapped around the sprocket wheels for engaging the teeth of the rack and causing the sprocket wheels to rotate in response to the movement of the float relative to the rack and its spar.

20. A WEC as claimed in claim 19, wherein at least one of the sprocket wheels is coupled to a generator to produce electrical energy.

21. A WEC as claimed in claim 14, wherein the linear to rotary converter includes means for maintaining tension in the belt and means for maintaining it engaged with its corresponding rack and spar.

22. A wave energy converter (WEC) comprising:
   a float for moving up and down in phase with the waves;
   a spar for guiding the up and down movement of the float; the spar having an upper portion and a lower portion which is intended to be permanently submerged when the WEC is operational and said spar including spar bearing rails having two opposing facets extending within a corresponding opening in the float; and
   a pair of power take off (PTO) rack and pinion modules coupled between the float and the spar for converting their relative motion into useful energy; one PTO module being coupled between the float and one facet of the spar bearing rails and the other PTO module being coupled between the float and the other facet of the spar bearing rails for responding to the mechanical interaction of the float with the portion of the spar in proximity to the float for converting their relative motion into useful energy and wherein the pair of modules are linked to each other with a pre-loading spring device to pull the pair of PTO modules together and apply constant pressure against their common bearing rail for coupling them to each other to balance forces generated due to the movement of the WEC.

23. A wave energy converter (WEC) as claimed in claim 22 wherein each PTO module includes:
   (a) a rack extending vertically along an external portion of the spar; and
   (b) a linear to rotary converter, mounted within the float, including a toothed member for engaging the rack and causing rotation of the rotary converter as a function of the up and down motion of the float relative to the spar.

24. A wave energy converter (WEC) as claimed in claim 22 wherein each PTO module includes:
   a wheeled structure fixedly mounted within the float with the outer portion of the wheeled structures in contact with the spar so as to rotate in response to the up down motion of the float; and each of the wheeled structure having a shaft which rotates correspondingly and which is connected to the shaft of a generator.

* * * * *